(12) United States Patent
Huang et al.

(10) Patent No.: US 7,696,731 B2
(45) Date of Patent: Apr. 13, 2010

(54) METHOD AND CIRCUIT FOR REDUCING SWITCHING RINGING IN SWITCHING REGULATOR

(75) Inventors: Jian-Rong Huang, Hsinchu (TW); Kuo-Lung Tseng, Taoyuan County (TW); Liang Pin Tai, Gueiren Township, Tainan County (TW)

(73) Assignee: Richtek Technology Corporation, HsinChu (TW)

( * ) Notice: Subject to any disclaimer, the term of this patent is extended or adjusted under 35 U.S.C. 154(b) by 453 days.

(21) Appl. No.: 11/897,342

(22) Filed: Aug. 30, 2007

(65) Prior Publication Data

US 2008/0211467 A1   Sep. 4, 2008

(30) Foreign Application Priority Data

Mar. 3, 2007   (TW) .............................. 96107328 A (51) Int. Cl.
  *G05F 1/40* (2006.01)
  *G05F 1/56* (2006.01)

(52) U.S. Cl. .................. 323/222; 323/282; 323/284
(58) Field of Classification Search ................. 323/222, 323/282, 284, 285
See application file for complete search history.

(56) References Cited

U.S. PATENT DOCUMENTS

| | | | | |
|---|---|---|---|---|
| 7,161,332 B1 * | 1/2007 | Kleine et al. | ................. | 323/222 |
| 7,161,333 B2 * | 1/2007 | Soch | ......................... | 323/224 |
| 7,196,499 B1 * | 3/2007 | Lipcsei | ........................ | 323/222 |
| 7,230,406 B2 * | 6/2007 | Huang et al. | ................. | 323/222 |
| 7,292,018 B2 * | 11/2007 | Chen | .......................... | 323/282 |
| 7,294,992 B2 * | 11/2007 | Yoshikawa | ................... | 323/222 |
| 2007/0069699 A1 * | 3/2007 | Lipcsei | ........................ | 323/222 |

* cited by examiner

*Primary Examiner*—Bao Q Vu
(74) *Attorney, Agent, or Firm*—Tung & Associates

(57) ABSTRACT

The present invention discloses a method and a circuit for reducing switching ringing in a switching regulator. The switching regulator comprises two transistors, and the two transistors are never simultaneously OFF. A phase lock loop may be provided to fix the output signal frequency of a PWM control circuit to a set frequency.

26 Claims, 9 Drawing Sheets

METHOD AND CIRCUIT FOR REDUCING SWITCHING RINGING IN SWITCHING REGULATOR

FIELD OF THE INVENTION

The present invention relates to a method and circuit for controlling a switching regulator, and in particular to a method and circuit for reducing switching ringing in a switching regulator.

BACKGROUND OF THE INVENTION

Figure 1:
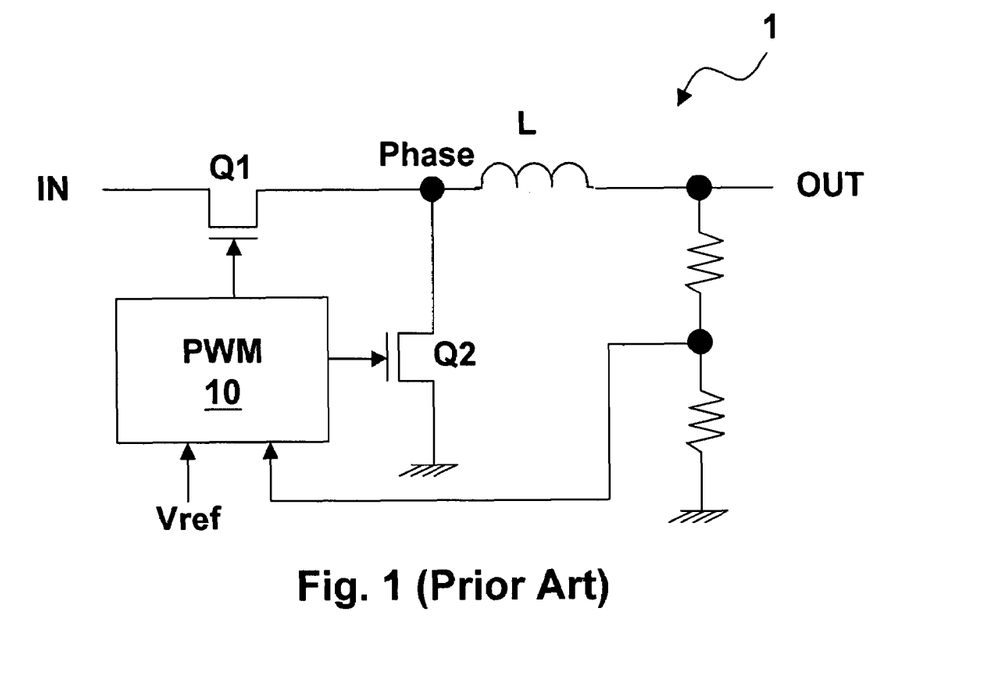
FIG. 1 is a circuit diagram schematically showing a conventional buck type switching regulator.

Typical switching regulators include buck converter, booster converter and inverter converter. FIG. 1 shows a conventional buck converter, which includes two transistor switches Q1 and Q2 controlled by a pulse width modulation circuit (PWM) 10. The switching of the transistors Q1 and Q2 controls the current amount and direction on the inductor L, so that power is transmitted to the output terminal OUT. The PWM 10 receives a voltage signal fed back from the output terminal, and compares it with a reference voltage Vref, to determine the duties of the transistors Q1 and Q2.

Figure 2:
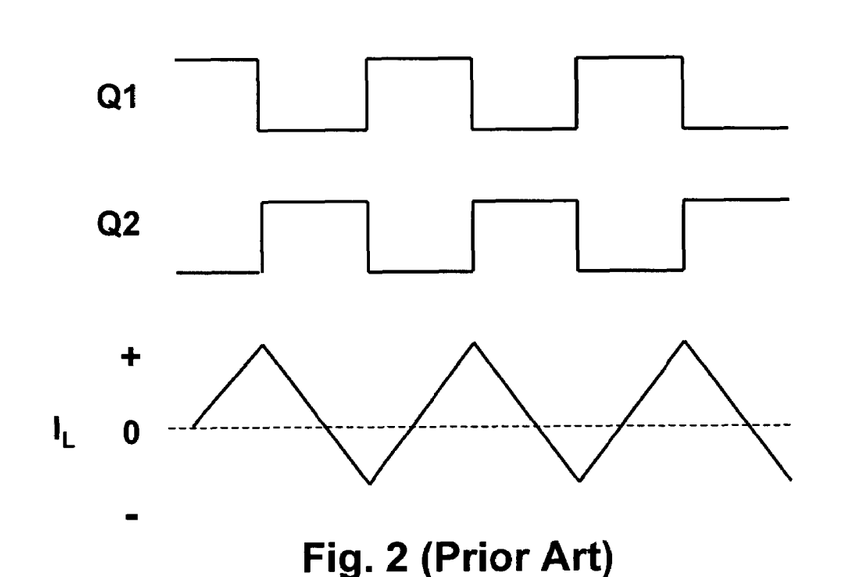
FIG. 2 schematically shows the waveforms in a conventional synchronous switching regulator.

In early days, the transistors Q1 and Q2 are completely complementary to each other, and such switching regulator is called "synchronous switching regulator". Referring to FIG. 2, when the transistor Q1 is ON, the transistor Q2 is OFF, and vise-versa. (In the context of this specification, "ON" is fully conductive, and "OFF" is non-conductive, regardless of leakage current.) In such synchronous switching regulator, the current $I_L$ of the inductor has a waveform as shown by the third waveform of FIG. 2: When the transistor Q1 is ON and the transistor Q2 is OFF, the current flows towards the output terminal OUT (shown by "+" in the figure), and the current amount increases. When the transistor Q2 is ON and the transistor Q1 is OFF, the voltage at the node Phase at the left side of the inductor drops to zero, and the voltage at the output terminal OUT is higher than the voltage at the node Phase, so the current trend reverses, first the current amount towards the output terminal decreases, and later the current starts to flow towards the other direction (shown by "−" in the figure).

Figure 3:
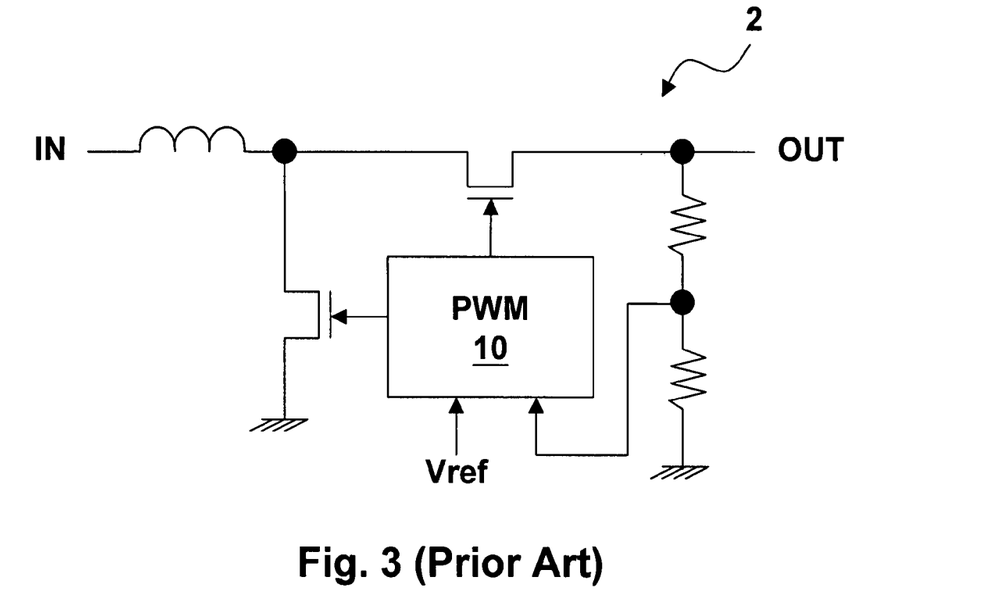
FIG. 3 is a circuit diagram schematically showing a conventional boost type switching regulator.
Figure 4:
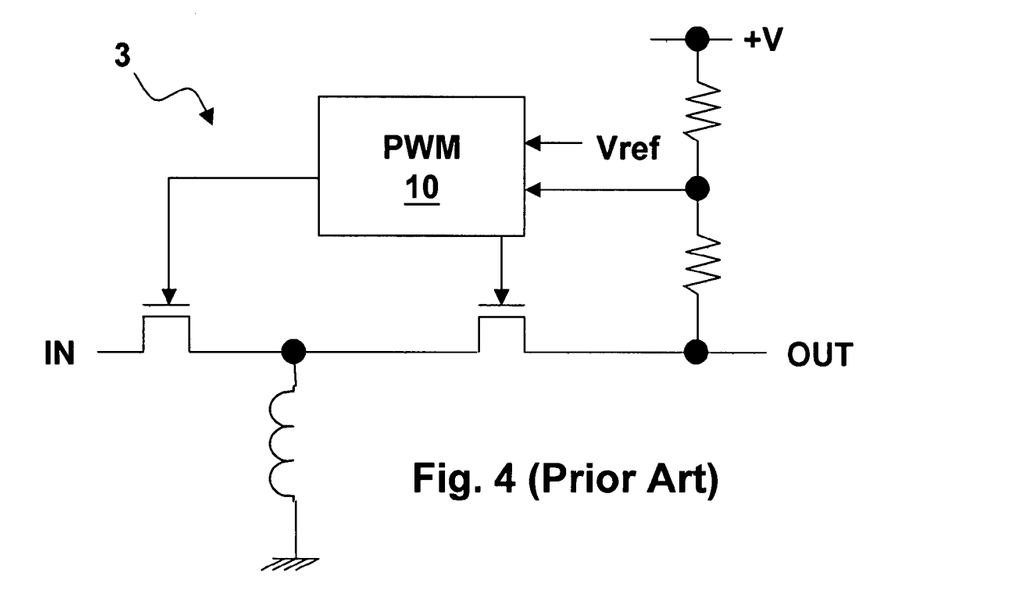
FIG. 4 is a circuit diagram schematically showing a conventional inverter type switching regulator.

FIGS. 3 and 4 respectively show a booster type switching regulator 2 and an inverter type switching regulator 3, which operate in a similar manner as above, in which a PWM 10 controls two transistors Q1 and Q2 to transmit power to the output terminal OUT according to comparison between a feedback voltage and a reference voltage Vref. These regulators are well known by one skilled in this art, so the details of their operation are omitted here.

Referring to FIGS. 1 and 2, there is a drawback to synchronously switch the transistors Q1 and Q2, because when the direction of the inductor current is negative, i.e., when current flows from the output terminal OUT to ground via the inductor L and the transistor Q2, it means that there is loss of power from the output terminal OUT.

Figure 5:
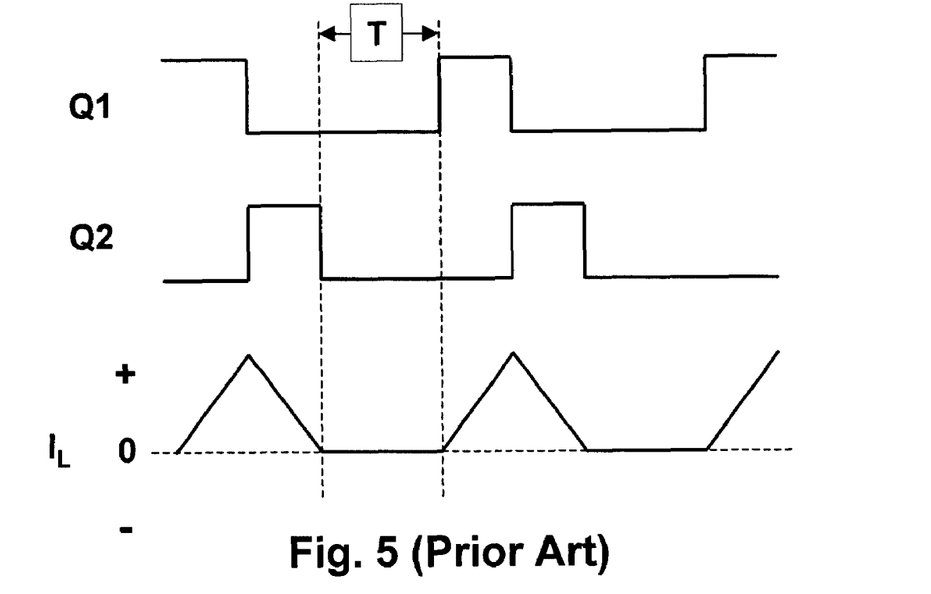
FIG. 5 schematically shows the ideal waveforms of the switching regulator proposed by U.S. Pat. No. 6,580,258.
Figure 6:
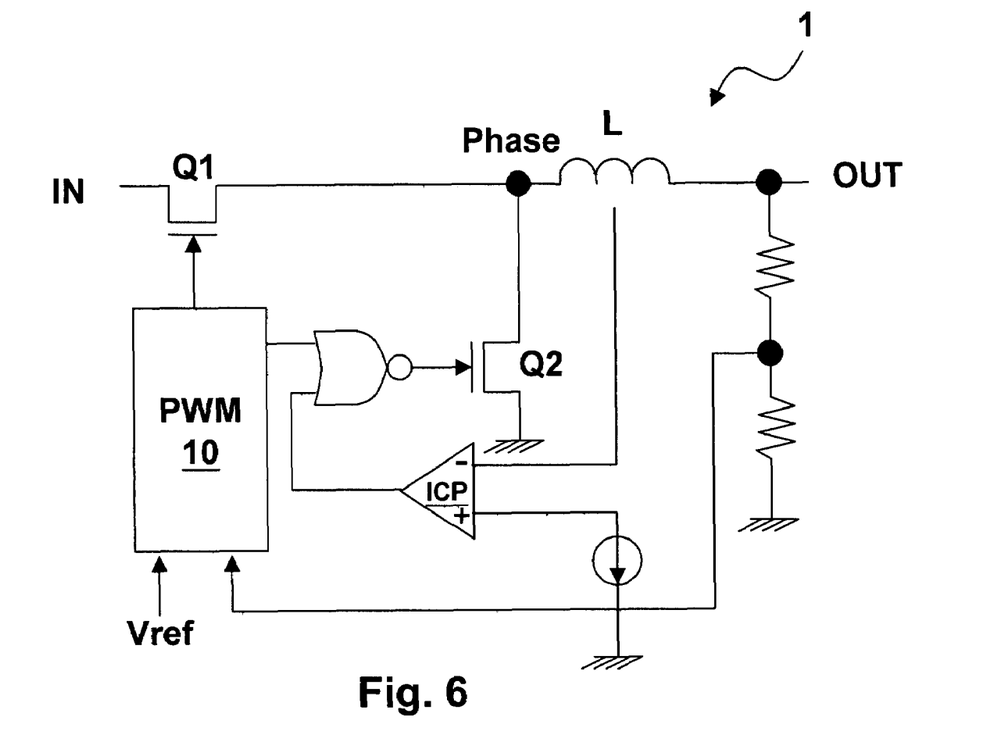
FIG. 6 is a circuit diagram schematically showing the control mechanism of U.S. Pat. No. 6,580,258.

Accordingly, U.S. Pat. No. 6,580,258 proposes a countermeasure as shown in FIG. 5, in which the transistors Q1 and Q2 are properly controlled so that the transistor Q2 is turned OFF when the direction of the inductor current is about to change from positive to negative. Thus, there is no power loss from the output terminal OUT. As shown in the figure, there is a time period T wherein the transistors Q1 and Q2 are both OFF, which is called the "sleep mode". In brief, the concept of this prior art is shown in FIG. 6, wherein a current comparator ICP compares a signal representative of inductor current with a reference. The output of the current comparator ICP and the output of PWM 10 are subject to logic operation, to determine whether to turn ON or OFF the transistor Q2.

Figure 7:
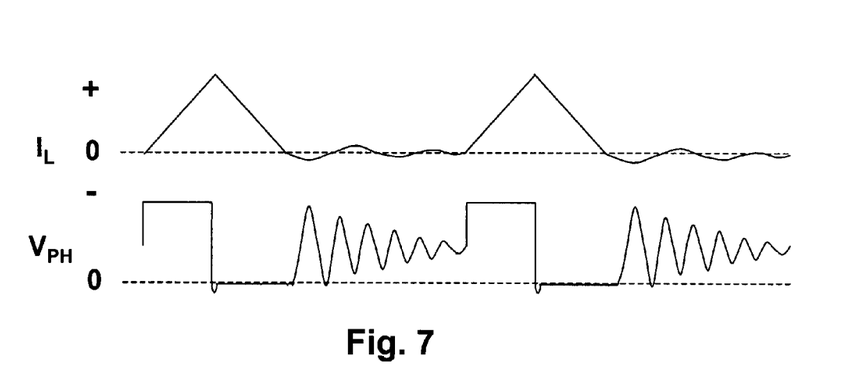
FIG. 7 schematically shows the actual waveforms of the switching regulator proposed by U.S. Pat. No. 6,580,258.

However, this prior art has its drawback. When the transistors Q1 and Q2 are both OFF, entering the sleep mode, the actual waveforms of the current flowing on the inductor L and the voltage at the node Phase are not ideal. As shown in FIG. 7, when the transistors Q1 and Q2 are both OFF, the current $I_L$ Of the inductor L presents a ringing waveform, and the voltage $V_{PH}$ at the node Phase presents a waveform of damped simple harmonic motion. During the high frequency ringing period, the circuit is unstable, and it generates EMI noises which are undesired. Hence, the ringing period should preferably be shortened.

In view of the foregoing, the present invention proposes a switching regulator with reduced EMI to improve the drawback in the prior art, and a control method for the switching regulator.

SUMMARY OF THE INVENTION

A first objective of the present invention is to provide a switching regulator having better power conversion efficiency as compared with a conventional synchronous switching regulator, while having significantly reduced ringing period as compared with the conventional switching regulator shown in FIGS. 5 and 7.

A second objective of the present invention is to provide a control method for controlling the switching regulator.

To achieve the foregoing objectives, according to an aspect of the present invention, a switching regulator comprises: a first transistor, a second transistor, and an inductor electrically connected to a common node; a pulse width modulation (PWM) circuit for generating pulse width modulated signals; an operational amplifier for comparing a voltage at the common node with a reference voltage; and a multiplexer circuit having a first input electronically connected with the output of the operational amplifier, a second input electronically connected with the output of the PWM circuit, and an output controlling the gate of the second transistor, the output of the multiplexer circuit being one of its inputs determined according to a current on the inductor.

According to another aspect of the present invention, a switching regulator comprises: a first transistor, a second transistor, and an inductor electrically connected to a common node; a pulse width modulation (PWM) circuit for generating pulse width modulated signals; an operational amplifier for comparing a signal representing a current on the inductor with a reference signal; and a multiplexer circuit having a first input electronically connected with the output of the operational amplifier, a second input electronically connected with the output of the PWM circuit, and an output controlling the gate of the second transistor, the output of the multiplexer circuit being one of its inputs determined according to a current on the inductor.

According to yet another aspect of the present invention, a method for reducing switching ringing in a switching regulator comprises the steps of: providing a switching regulator having a first transistor, a second transistor, and an inductor electrically connected to a common node; comparing a voltage at the common node with a reference voltage within a time period when the first transistor is OFF; and controlling the gate of the second transistor so that the second transistor is in a low current state according to the comparison result.

According to a further aspect of the present invention, a method for reducing switching ringing in a switching regulator comprises the steps of: providing a switching regulator having a first transistor, a second transistor, and an inductor electrically connected to a common node; comparing a signal representing a current on the inductor with a reference signal within a time period when the first transistor is OFF; and controlling the gate of the second transistor so that the second transistor is in a low current state according to the comparison result.

According to the present invention, preferably, a phase lock loop is provided to lock the output of the PWM circuit to a set frequency.

For better understanding the objectives, characteristics, and effects of the present invention, the present invention will be described below in detail by illustrative embodiments with reference to the attached drawings.

DETAILED DESCRIPTION OF THE PREFERRED EMBODIMENT

The key feature of the present invention is "not to concurrently turn OFF the transistors Q1 and Q2". When the current $I_L$ on the inductor L is about to change from positive to negative, the transistor Q2 is not completely turned OFF, but instead it is switched to a "weak conduction state", or "low current state" wherein it allows low current to flow through. Thus, as compared with the prior art in FIG. 2, the present invention has better power conversion efficiency, and in comparison with the conventional switching regulator shown in FIGS. 5 and 7, the present invention significantly reduces the duration of ringing.

Figure 8:
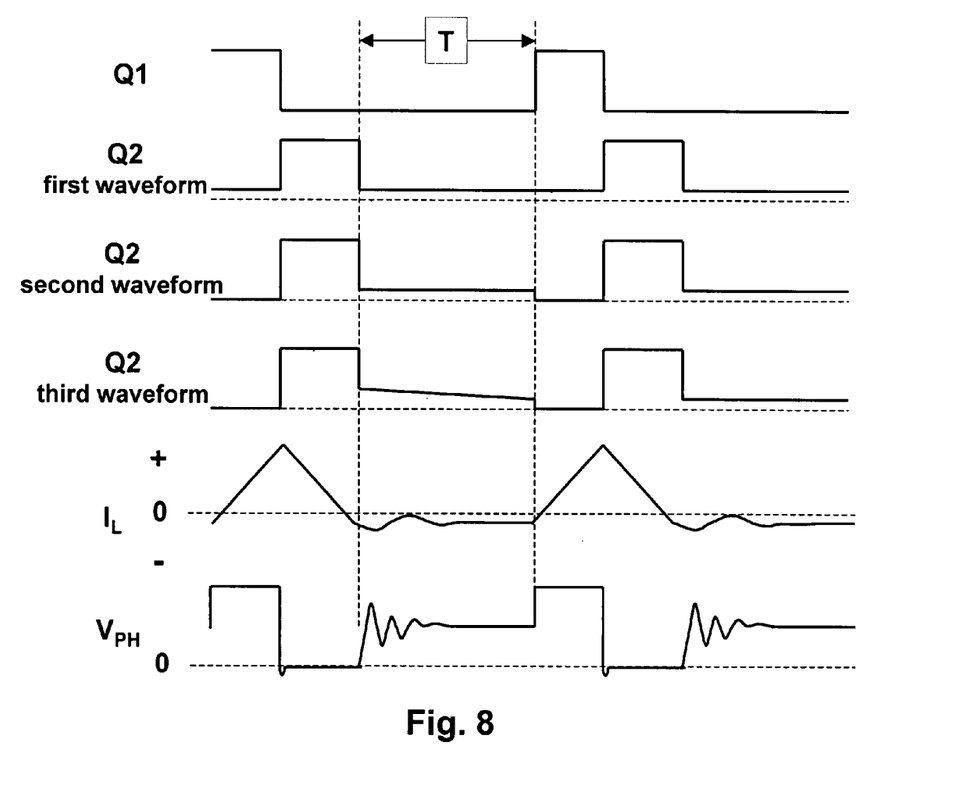
FIG. 8 schematically shows the actual waveforms of the switching regulator according to the present invention.

To further explain it, please refer to FIG. 8 in conjunction with FIGS. 5 and 7. In prior art, the transistor Q2 assumes only one role, which is a switch, so it has only two states (completely ON and completely OFF). When the transistors Q1 and Q2 enter the sleep mode, they are both OFF. However, there is no such sleep mode in the present invention; as shown in FIG. 8, when the current $I_L$ on the inductor L is about to change from positive to negative, the transistor Q2 is not completely turned OFF, but switched to a "weak conduction state" or "low current state" wherein it allows low current to flow through. There are three ways to manage this: first, as shown by the first Q2 waveform, it can be arranged so that the transistor Q2 is always in the low current state unless it is ON. In this arrangement, the transistor Q2 includes only two states: ON, and low current. Or, as shown by the second Q2 waveform, it can be arranged so that the transistor Q2 is OFF when the transistor Q1 is ON, and the transistor Q2 is changed to the low current state only in the time period T. Thus, the transistor Q2 includes three states: ON, OFF, and low current. Or, as shown by the third Q2 waveform, it can be arranged so that the current amount of the transistor Q2 decreases in the low current state period, that is, the current is higher in the beginning of the low current state period and lower later. The first arrangement is advantageous in that it is less complicated in circuit hardware; the second arrangement is advantageous in that it has better power conversion efficiency; and the third arrangement is advantageous in that it reduces ringing faster. Each of the three arrangements has its merits and all of them belong to the scope of the present invention.

Those skilled in this art would readily find that the transistors Q1 and Q2 shown in the figures are NMOS transistors. Certainly the transistors Q1 and Q2 can be replaced by PMOS transistors; although the corresponding waveforms are different, it still falls in the spirit of the present invention.

Please refer to FIG. 8 in conjunction with FIG. 7. Under the arrangement according to the present invention, in the time period T when the transistor Q1 is OFF and the transistor Q2 is in the low current state, although the voltage $V_{PH}$ at the node Phase presents a damped simple harmonic motion waveform, the ringing quickly diminishes and the waveform quickly reaches a stable status. Please note that for illustrative purpose the waveform is drawn in an exaggerated scale. In practical case, the ringing period can be shortened than what is shown, by embodiments according to the present invention described below.

The "low current" according to the present invention is any amount of current higher than or equal to 1 μA (micro-ampere) but below the current amount when the transistor is fully conductive. Also please note that, although the gate voltage of the transistor Q2 is shown in FIG. 8 to be a linear waveform in the time period T, the present invention is not limited to such. The gate voltage of the transistor Q2 can vary in any desired manner, i.e., can be of any linear or non-linear waveform in the time period T, provided that the current amount meets the foregoing requirement.

Figure 9:
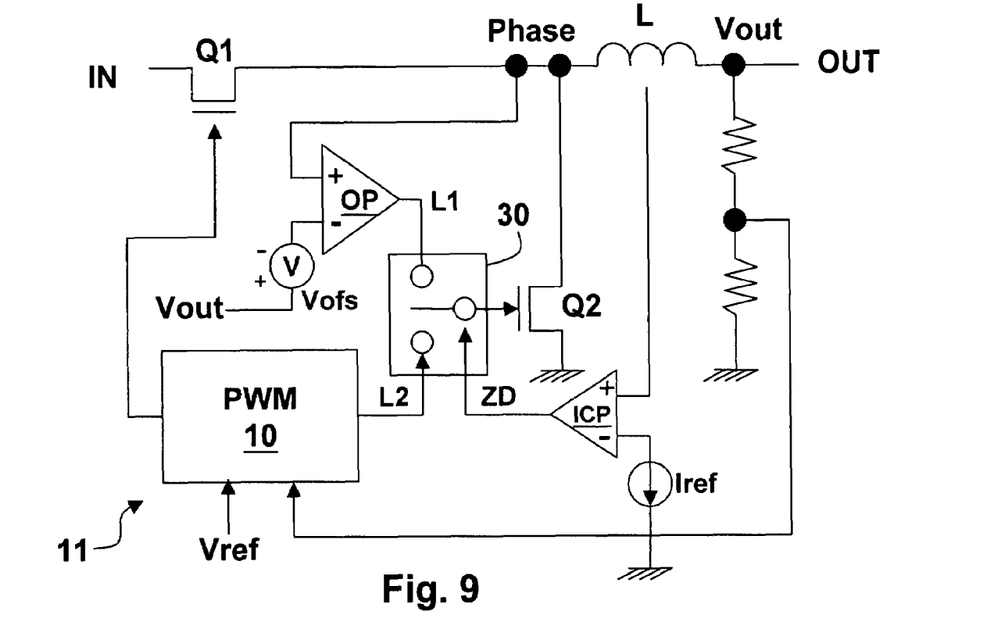
FIG. 9 is a circuit diagram schematically showing a first embodiment of the present invention.

The waveforms shown in FIG. 8 can be realized in multiple ways. Referring to FIG. 9 which schematically shows a first preferred embodiment of a buck type switching regulator according to the present invention, the buck type switching regulator 11 includes, in addition to the up-gate and low-gate transistor switches Q1 and Q2, the inductor L, the current comparator ICP, and the PWM control circuit (PWM) 10, an operational amplifier OP. One input of the operational amplifier OP receives the voltage at the node Phase, while the other input of the operational amplifier OP receives a voltage slightly lower than the output voltage Vout. In the figure, a voltage source Vofs is shown to symbolically express that the operational amplifier OP receives a voltage of Vout-Vofs. It should be noted that there does not have to be a physical device having a voltage Vofs; similar effect can be achieved by providing an internal offset voltage between the two inputs of the operational amplifier OP. If a physical device is provided, the device can be a resistor, any kind of diodes, and so on. The operational amplifier OP compares the two inputs with each other, and outputs a signal L1 based on the result of comparison.

The gate of the transistor Q2 is controlled by a multiplexer circuit 30; the output of the multiplexer circuit 30 determines whether the transistor Q2 is controlled by the output L2 from the PWM 10 or the output L1 from the multiplexer circuit 30. When the transistor Q2 is controlled by the signal L2, its role is a switch; when the transistor Q2 is controlled by the signal L1, it can be in a low current state in which the transistor Q2 is weakly conductive.

Figure 10:
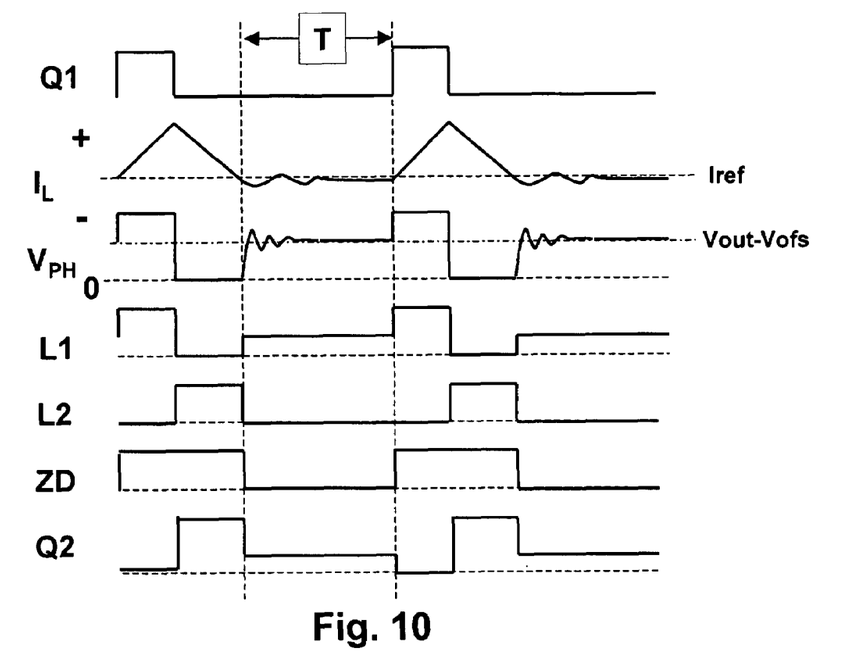
FIG. 10 schematically shows the waveforms of the embodiment shown in FIG. 9.

The operation of the circuit can be understood with reference to FIG. 10. First referring to the waveform of the signal L1, when the transistor Q1 is ON and the transistor Q2 is OFF, the voltage at the node Phase is equal to the voltage at the input terminal IN; when the transistor Q1 is OFF and the transistor Q2 is ON, the voltage at the node Phase is equal to zero; when the transistor Q2 is weakly conductive, a small amount of current flows from the output terminal OUT, via the inductor L and the transistor Q2, to ground. In the last case, it means that the right side of the inductor L has a voltage level slightly higher than the voltage level of its left side, and thus the voltage at the node Phase is slightly lower than the output voltage Vout. By virtue of feedback control mechanism, the voltage level of the signal L1 will be stabilized at a voltage value of Vout-Vofs. The operational amplifier OP can be properly designed so that when the voltage at the node Phase is equal to Vout-Vofs, the transistor Q2 is weakly conductive. Hence, the signal L1 has a three-stage waveform as shown. The signal L2 is the output from the PWM 10, which is a simple pulse waveform. The signal ZD is the output from the current comparator ICP. Referring to the waveform of the inductor current $I_L$, when the inductor current $I_L$ is higher than a reference level Iref (which can be a value of zero or slightly lower than zero, depending on the design of the input terminals of the current comparator ICP), the signal ZD is high; when the inductor current $I_L$ is lower than or equal to the reference level Iref, the signal ZD is low. In one embodiment, the current comparator ICP is a hysteretic comparator, to filter minor noises. When the signal ZD is high, the multiplexer circuit 30 selects the signal L2; when the signal ZD is low, the multiplexer circuit 3Q selects the signal L1. Thus, the gate signal of the transistor Q2 is as shown in the lowermost waveform of the figure.

Figure 11:
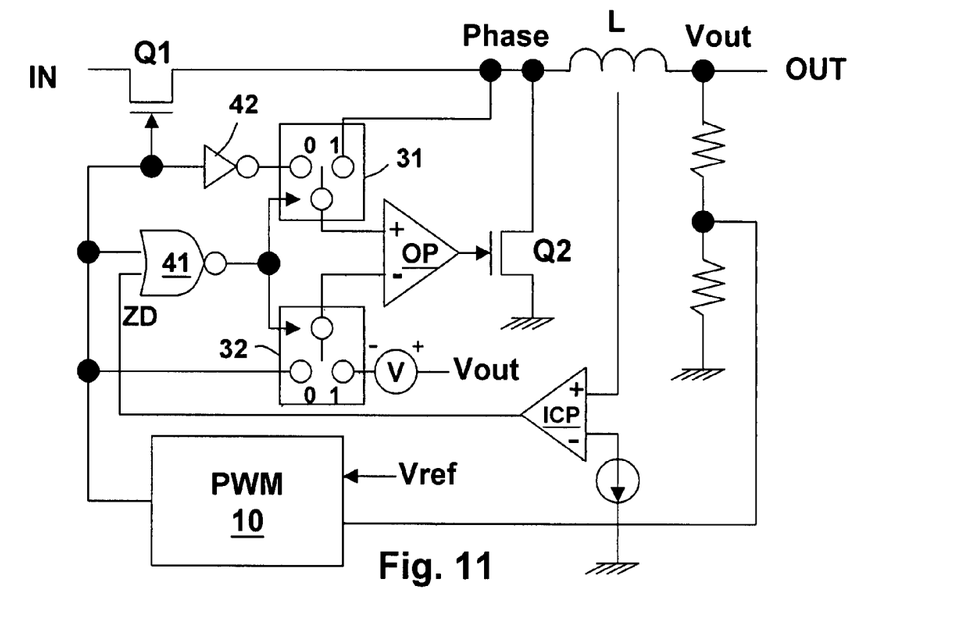
FIG. 11 is a circuit diagram schematically showing a second embodiment of the present invention.

The embodiment of FIG. 9 is not the only way to embody the present invention. FIG. 11 is a schematic circuit diagram showing another way to control the gate of the transistor Q2. Note that in this embodiment, the PWM 10 only needs to generate PWM signals for the gate of the transistor Q1; it does not have to generate another set of PWM signals for the transistor Q2, but instead, the circuit only requires the inverted signals of the PWM signals for the gate of the transistor Q1. Hence, the PWM 10 can be much simpler in circuit structure.

More specifically, referring to FIGS. 11 and 12, by virtue of the NOR gate 41, only when the PWM signal for the gate of the transistor Q1 (hereinafter "the PWM signal") and the output signal ZD from the current comparator ICP are both low, the output SWO of the NOR gate 41 is high (1), which is the time period T in the figure. In this period, due to the multiplexer circuits 31 and 32, the positive and negative inputs of the operational amplifier OP are the voltage at the node Phase and Vout-Vofs, respectively, so the transistor Q2 is weakly conductive. On the other hand, in ay time period other than the period T, the positive and negative inputs of the operational amplifier OP are the inverted PWM signal and the PWM signal; thus, the output of the operational amplifier OP follows the inverted PWM signal, and the waveform of the gate of the transistor Q2 is as shown.

Figure 13:
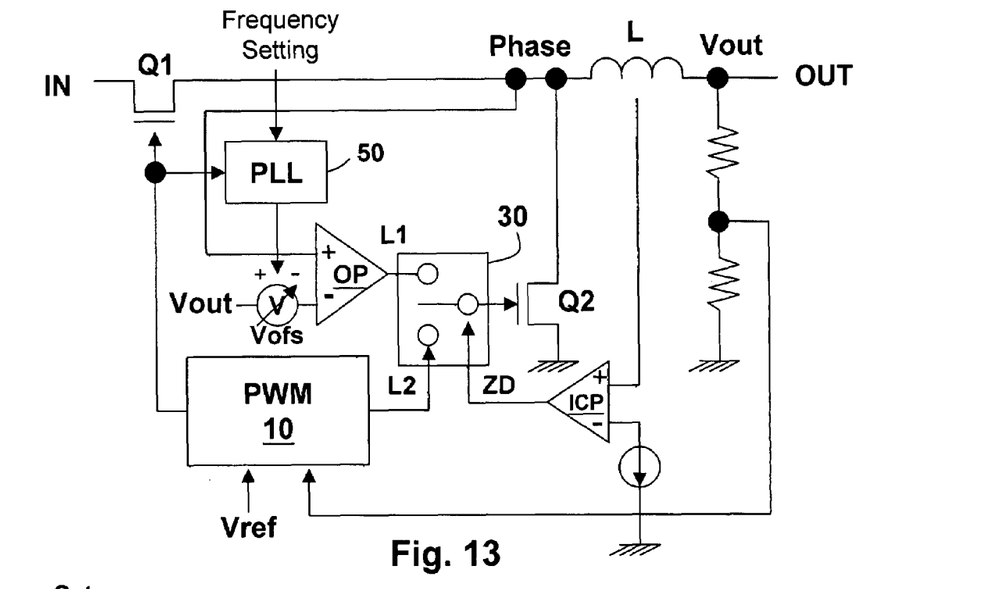
FIG. 13 is a circuit diagram schematically showing a third embodiment of the present invention.

In addition to what are shown in FIGS. 9 and 11, FIG. 13 shows another embodiment according to the present invention. This embodiment has a feature that the output pulse frequency of the PWM 10 is adjustable, for purpose such as to avoid audible noises, or frequency jittering, etc.

Figure 14:
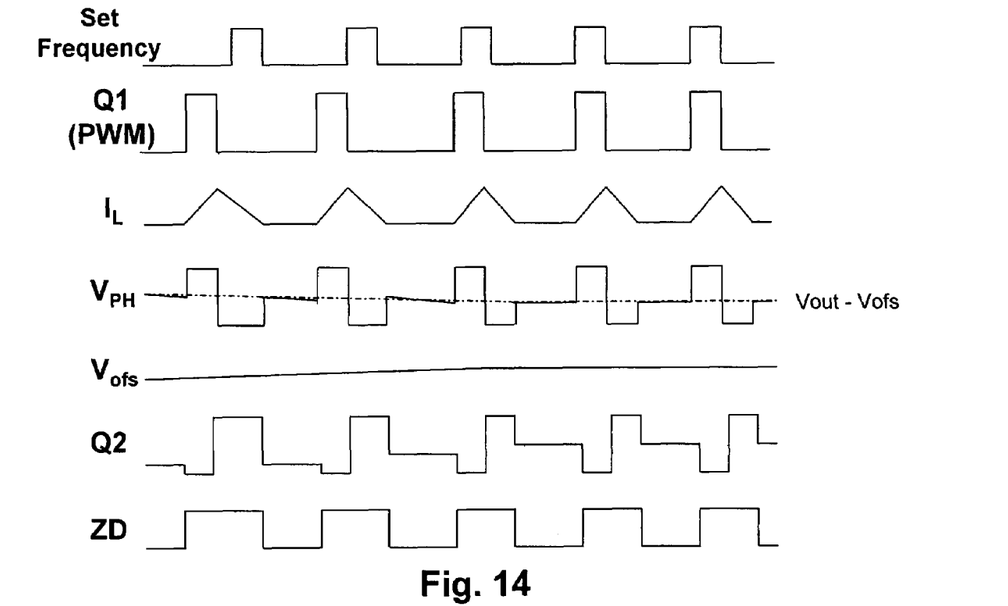
FIG. 14 schematically shows the waveforms of the embodiment shown in FIG. 13.

More specifically, this embodiment is different from the embodiment of FIG. 9 in that a phase lock loop circuit (PLL) 50 is provided, and the voltage source Vofs is a variable voltage source controlled by the output of the PLL 50. Referring to FIG. 13 in conjunction with FIG. 14 (wherein the ringing noise is omitted for simplicity), if the desired frequency of the PWM signal is the first waveform, this waveform is provided to the input of the PLL 50 as the set frequency. When the frequency of the PWM signal is lower than the set frequency, but the required output voltage Vout is unchanged, the frequency of the PWM signal can be forced to increase by increasing the current flowing from the node Phase to ground via the transistor Q2 (so that the voltage at the node Phase decreases). In other words, when the frequency of the PWM signal is lower than the set frequency, the output of the PLL 50 should increase the voltage of the variable voltage source Vofs so that the value Vout-Vofs decreases. Thus, the operational amplifier OP will increase the conduction of the transistor Q2 to lower the voltage at the node Phase, so that at the final stable status, the frequency of the PWM signal is equal to the set frequency.

The same spirit can be applied to the embodiment shown in FIG. 11, that is, to add a PLL 50 in it. The details of the circuit structure and the signal waveforms are omitted here.

Figure 15:
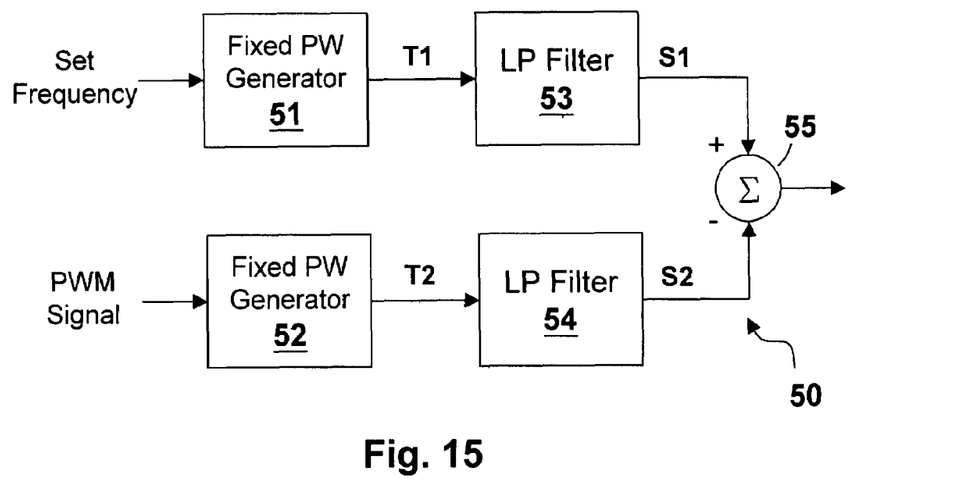
FIG. 15 shows one circuit structure to embody a phase lock loop.

There are many ways to embody the PLL 50. As an example, please refer to FIG. 15, in which the set frequency and the PWM signal are inputted to fixed pulse width generators (fixed PW generators) 51 and 52, respectively. The fixed PW generators generate pulse signals T1 and T2 of fixed pulse widths according to the triggering edges of the input signals, respectively. The pulse signals T1 and T2 respectively pass low pass filters (LP filters) 53 and 54, to convert the frequencies of the pulse signals T1 and T2 into analog signals S1 and S2. A subtraction circuit 55 subtract the analog signal S2 from the signal S1, and the output of the subtraction circuit 55 is a signal for adjusting the variable voltage source Vofs.

Figure 16:
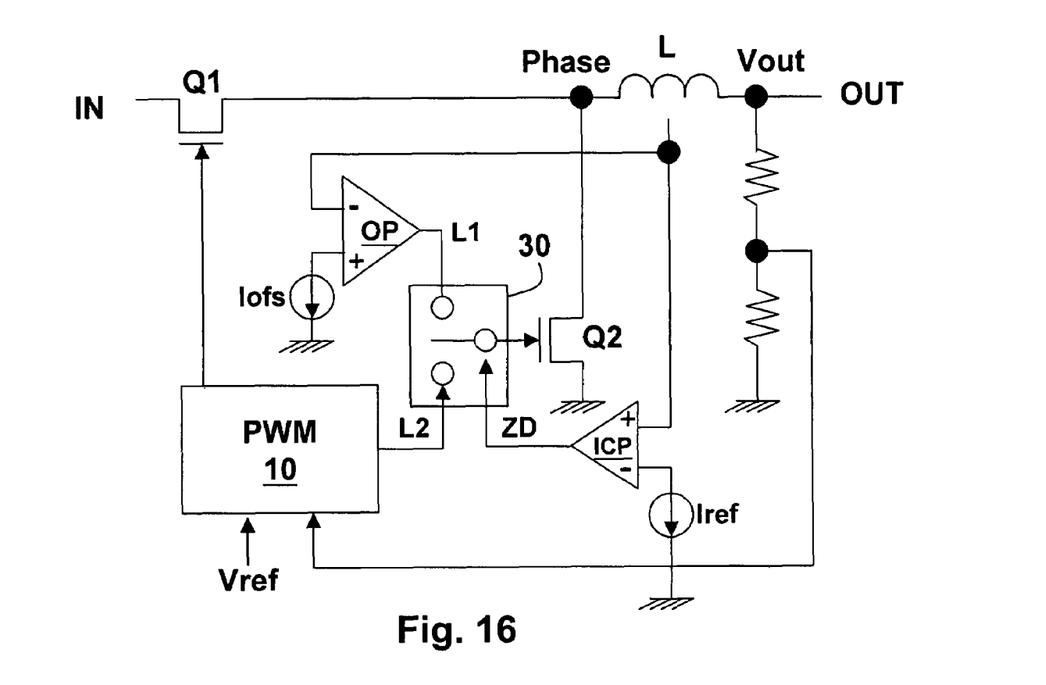
FIGS. 16-18 are circuit diagrams schematically showing three other embodiments of the present invention.

FIG. 16 shows another embodiment of the present invention. Besides comparing the voltage at the node Phase with a reference voltage as described in the foregoing embodiments, the transistor Q2 can be controlled according to the inductor current $I_L$. As shown in the figure, the inductor current $I_L$ is compared with a reference current Iofs (in actual circuit, it is to compare a voltage signal representing the inductor current $I_L$ and a voltage signal representing the reference current Iofs, so the difference is a voltage signal). The comparison result is amplified by the operational amplifier OP to generate an analog signal which renders the transistor Q2 weakly conductive. More specifically, when the signal ZD is high, the multiplexer circuit 30 selects the signal L2, whereby the transistor Q2 is controlled by the PWM 10 and is either ON or OFF. When the signal ZD is low, the multiplexer circuit 30 selects the signal L1, whereby the transistor Q2 is controlled by the output of the operational amplifier OP and is weakly conductive. In the latter case, by feedback control mechanism, the inductor current $I_L$ will be kept the same as the reference current Iofs, so that when the transistor Q1 is OFF, the transistor Q2 is kept weakly conductive, with a current amount of Iofs.

Figure 17:
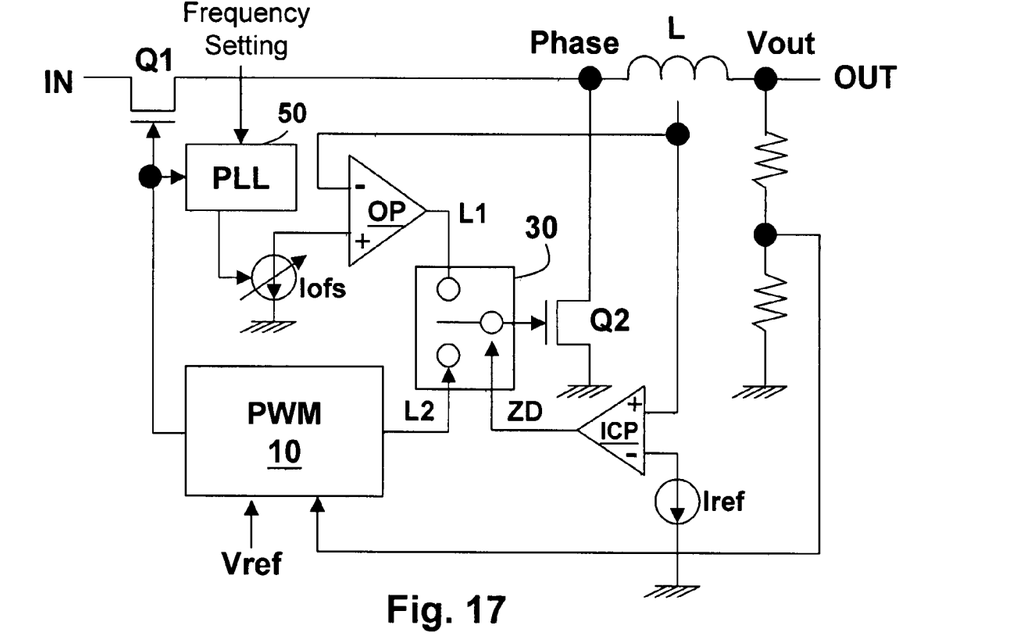

Similar to the embodiment of FIG. 13, this embodiment can be additionally provided with a PLL 50 to control the output pulse frequency of the PWM 10. FIG. 17 shows such a circuit, wherein the output of the PLL 50 controls a variable reference current Iofs, so that the weakly conductive status, i.e., the current on the transistor Q2, is adjustable.

Figure 18:
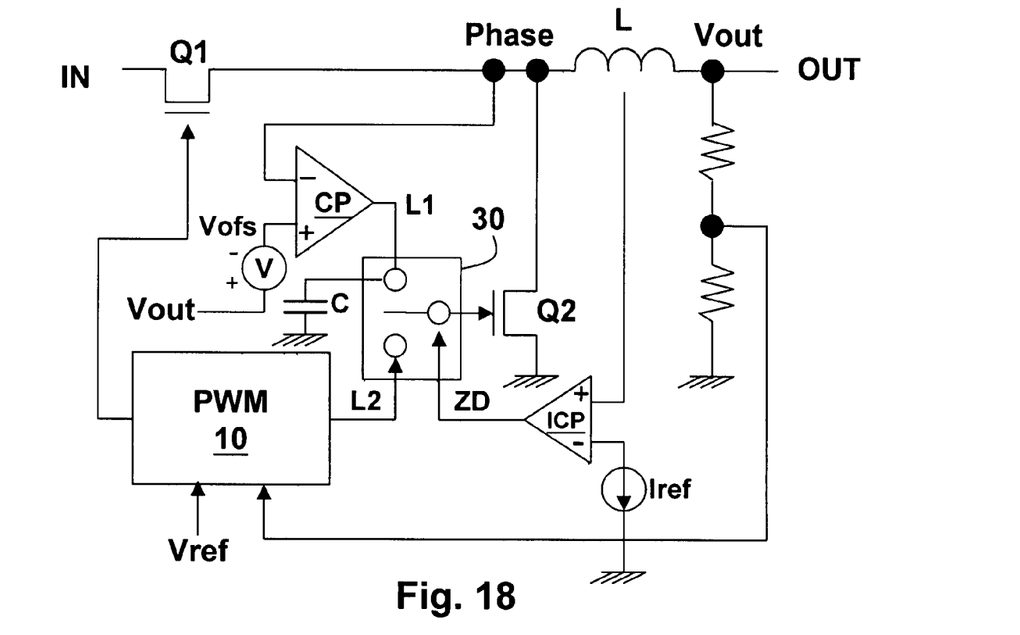

There are still other modifications based on the spirit of the present invention. In all of the foregoing embodiments, an operational amplifier OP is used to control the gate of the transistor Q2 in an analogous fashion. However, the operational amplifier OP can be replaced by a comparator CP. With such replacement, the embodiment of FIG. 9 becomes the embodiment shown in FIG. 18, wherein when the voltage at the node Phase is lower than Vout-Vofs, the output of the comparator CP charges a capacitor C. When the signal ZD selects the signal L1, and when the voltage at the node Phase is equal to Vout-Vofs, the output of the comparator CP is low, but the gate of the transistor Q2 is controlled by the voltage across the capacitor C which is set to let the transistor Q2 be weakly conductive. Thus, the circuit achieves the same purpose as desired. In a similar manner, all the above mentioned embodiments can be modified. The details are not redundantly repeated here.

The spirit of the present invention can be similarly applied to boost type switching regulator 12 and inverter type switching regulator 13, as respectively shown in FIGS. 10 and 11. The detailed descriptions for such switching regulators are omitted here because they are well known by one skilled in this art.

Figure 12:
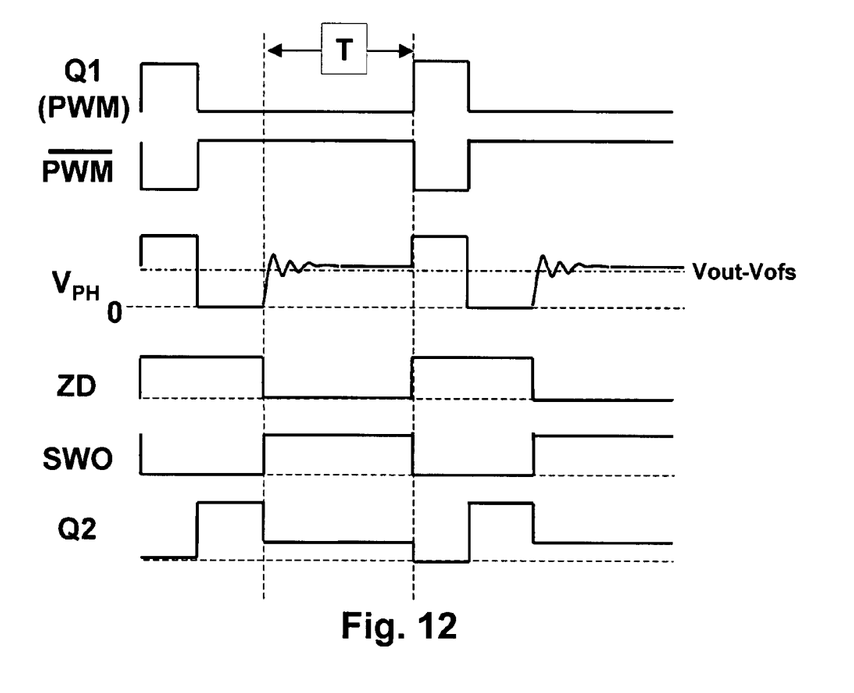
FIG. 12 schematically shows the waveforms of the embodiment shown in FIG. 11.

As to how the current source control circuit 20 controls the current amount passing through the transistor Q2, please refer to FIG. 12 which is an embodiment of the current source control circuit 20. It shows that the current source control circuit 20 and the transistor Q2 construct a current mirror which mirrors the current on the path 22 inside the current source control circuit 20 proportionally to the source-to-drain path of the transistor Q2. The amount of current on the path 22 inside the current source control circuit 20 can be decided by a current source 24.

The current source control circuit 2Q can be embodied in various ways other than the above. FIG. 13 shows another embodiment of the current source control circuit 20 which also mirrors the current on the path 22 inside the current source control circuit 20 proportionally to the source-to-drain path of the transistor Q2. In light of the teaching by the present invention, one skilled in this art can readily think of many other variations, which should all belong to the scope of the present invention.

The multiplexer circuits 30, 31 and 32 in the foregoing embodiments do not have to be a gate circuit, but instead can simply be a node, as long as the selected input can override the other input.

By way of example, the present invention has been described with reference to buck type switching regulators. The spirit of the present invention can be similarly applied to boost type and inverter type switching regulators, by modifying the reference input of the operational amplifier OP. The details thereof are omitted here for they can be readily achieved by those skilled in this art under the foregoing teachings of the present invention.

The features, characteristics and effects of the present invention have been described with reference to its preferred embodiments, which are provided only for illustrative purpose. Various other substitutions and modifications will occur to those skilled in the art, without departing from the spirit of the present invention. For example, in the described embodiments, the feedback signal to be inputted to the PWM 10 for comparison with the reference voltage Vref is obtained by dividing the output voltage Vout. However, the feedback signal can be obtained by many ways other than such. As another example, one can insert circuits such as a delay circuit or a driver gate between two circuit devices shown in the embodiments, without changing the primary function of the overall circuit. The transistors Q1 and Q2 can be integrated in an integrated circuit, or can be discrete devices externally connected to an integrated circuit. The embodiment of FIG. 16 can be modified in the same manner as FIG. 11. Therefore, all such substitutions and modifications are intended to be embraced within the scope of the invention as defined in the appended claims.

What is claimed is:

1. A method for reducing switching ringing in a switching regulator comprises the steps of:
    providing a switching regulator having a first transistor, a second transistor, and an inductor electrically connected to a common node;
    comparing a voltage at the common node with a reference voltage within a time period when the first transistor is OFF; and
    controlling the gate of the second transistor so that the second transistor is in a low current state according to the comparison between the voltage at the common node and the reference voltage.

2. The method of claim 1, wherein a current passing through the second transistor is higher in the beginning of the low current state and lower later.

3. The method of claim 1, further comprising: adjusting the voltage at the common node so that the switching frequency of the first transistor is equal to a set frequency.

4. The method of claim 3, wherein the step of adjusting the voltage at the common node includes:
    providing a phase lock loop circuit;
    comparing the set frequency with the switching frequency of the first transistor by the phase lock loop circuit;
    controlling the reference voltage according to the comparison between the set frequency and the switching frequency of the first transistor; and
    controlling the second transistor to adjust the voltage at the common node.

5. A method for reducing switching ringing in a switching regulator comprises the steps of:
    providing a switching regulator having a first transistor, a second transistor, and an inductor electrically connected to a common node;
    comparing a signal representing a current on the inductor with a reference signal within a time period when the first transistor is OFF; and
    controlling the gate of the second transistor so that the second transistor is in a low current state according to the comparison between the signal representing a current on the inductor and the reference signal.

6. The method of claim 1, wherein a current passing through the second transistor is higher in the beginning of the low current state and lower later.

7. The method of claim 1, further comprising: adjusting the current on the inductor so that the switching frequency of the first transistor is equal to a set frequency.

8. The method of claim 7, wherein the step of adjusting the current on the inductor includes:
    providing a phase lock loop circuit;
    comparing the set frequency with the switching frequency of the first transistor by the phase lock loop circuit;

controlling the reference signal according to the comparison between the set frequency and the switching frequency of the first transistor; and controlling the second transistor to adjust the current on the inductor.

9. A switching regulator comprising:
a first transistor, a second transistor, and an inductor electrically connected to a common node;
a pulse width modulation (PWM) circuit for generating pulse width modulated signals;
an operational amplifier for comparing a voltage at the common node with a reference voltage; and
a multiplexer circuit having a first input electronically connected with the output of the operational amplifier, a second input electronically connected with the output of the PWM circuit, and an output controlling the gate of the second transistor, the output of the multiplexer circuit being one of its inputs determined according to a current on the inductor.

10. The switching regulator of claim 9, wherein the second transistor has at least two states: ON and low current state.

11. The switching regulator of claim 10, wherein a current passing through the second transistor is higher in the beginning of the low current state and lower later.

12. The switching regulator of claim 10, wherein when the first transistor is ON, the second transistor is OFF; and when the first transistor is OFF, the second transistor is ON or in the low current state.

13. The switching regulator of claim 10, wherein when the first transistor is ON, the second transistor is in the low current state; and when the first transistor is OFF, the second transistor is ON or in the low current state.

14. The switching regulator of claim 9, wherein the PWM circuit only generates pulse width modulated signals required by the first transistor.

15. The switching regulator of claim 9, wherein the reference voltage is variable.

16. The switching regulator of claim 15, further comprising a phase lock loop circuit for controlling the reference voltage.

17. The switching regulator of claim 9, wherein the switching regulator is a buck type switching regulator, a boost type switching regulator, or an inverter type switching regulator.

18. A switching regulator comprising:
a first transistor, a second transistor, and an inductor electrically connected to a common node;
a pulse width modulation (PWM) circuit for generating pulse width modulated signals;
an operational amplifier for comparing a signal representing a current on the inductor with a reference signal; and
a multiplexer circuit having a first input electronically connected with the output of the operational amplifier, a second input electronically connected with the output of the PWM circuit, and an output controlling the gate of the second transistor, the output of the multiplexer circuit being one of its inputs determined according to a current on the inductor.

19. The switching regulator of claim 18, wherein the second transistor has at least two states: ON and low current state.

20. The switching regulator of claim 19, wherein a current passing through the second transistor is higher in the beginning of the low current state and lower later.

21. The switching regulator of claim 19, wherein when the first transistor is ON, the second transistor is OFF; and when the first transistor is OFF, the second transistor is ON or in the low current state.

22. The switching regulator of claim 19, wherein when the first transistor is ON, the second transistor is in the low current state; and when the first transistor is OFF, the second transistor is ON or in the low current state.

23. The switching regulator of claim 18, wherein the PWM circuit only generates pulse width modulated signals required by the first transistor.

24. The switching regulator of claim 18, wherein the reference voltage is variable.

25. The switching regulator of claim 24, further comprising a phase lock loop circuit for controlling the reference voltage.

26. The switching regulator of claim 18, wherein the switching regulator is a buck type switching regulator, a boost type switching regulator, or an inverter type switching regulator.

* * * * *